United States Patent [19]

Yamaguchi et al.

[11] Patent Number: 5,031,059
[45] Date of Patent: Jul. 9, 1991

[54] ROTATING DISK STORAGE DEVICE WITH COOLING GAS FLOW CONTROL

[75] Inventors: Yuzo Yamaguchi, Tsuchiura; Kenichiro Matsubara; Takeshi Shibuya, both of Ibaraki; Hiroshi Nishida, Kanagawa, all of Japan

[73] Assignee: Hitachi, Ltd., Tokyo, Japan

[21] Appl. No.: 478,036

[22] Filed: Feb. 9, 1990

Related U.S. Application Data

[63] Continuation of Ser. No. 118,738, Nov. 4, 1987, abandoned.

[30] Foreign Application Priority Data

Nov. 7, 1986 [JP] Japan .................. 61-263770

[51] Int. Cl.⁵ .............................................. G11B 33/14
[52] U.S. Cl. ................................................ 360/97.03
[58] Field of Search ........................ 360/97.01–97.03

[56] References Cited

U.S. PATENT DOCUMENTS 3,720,931  3/1973  Andersen .................. 360/97.03
4,367,502  1/1983  Iftikar ............................ 360/98

FOREIGN PATENT DOCUMENTS 60-212885  10/1985  Japan ........................ 360/97
61-196494   8/1986  Japan ........................ 360/97

Primary Examiner—A. J. Heinz
Attorney, Agent, or Firm—Antonelli, Terry, Stout & Kraus

[57] ABSTRACT

A rotating disk storage device has a plurality of disks fitted onto a spindle, transducers supported by transducer supporting means for movement in face-to-face relationship with surfaces of the disks, and drive means for causing the transducer supporting means to move in a predetermined direction. Separating means provides for separation of a disk housing for housing the disks and a drive-mechanism housing for housing a drive mechanism. The separating means has a first opening for allowing the discharge of gas for cooling the drive mechanism and a second opening for allowing the gas which has cooled it to be discharged via discharge means. The separating means has flow resisting means on the side of the disk housing so as to prevent the gas from flowing backward into the first and second openings.

26 Claims, 7 Drawing Sheets

ROTATING DISK STORAGE DEVICE WITH COOLING GAS FLOW CONTROL

This application is a continuation of application Ser. No. 118,738, filed on Nov. 4, 1987 now abandoned.

BACKGROUND OF THE INVENTION

The present invention relates to a rotating disk storage device and, more particularly, to a rotating disk storage device of the airtightly enclosed type that has a gas-circulation structure suitable for use in cooling the device and in eliminating dust therefrom.

In general, typical rotating disk storage devices such as magnetic disk device have structures which enable elimination of dust from the interior of the devices and cooling of drive systems therein. Japanese Patent Unexamined Publication No. 8692/1980 (U.S. Pat. No. 4,190,870) discloses such a structure having a forced-air supply system in which rotating disks such as magnetic disks surrounded by a shroud as well as an access mechanism of the rotating disks are airtightly enclosed by a cover, with clean air being supplied from the exterior into the cover. Japanese Patent Unexamined Publication No. 200480/1983 discloses an inner circulation system utilizing the flow of air circulated by the rotation of the rotating disks in the device.

The above-mentioned forced-air supply system involves various disadvantages. For example, it is likely that dust or moisture may enter from the exterior and that an increase in cost and a decrease in space storage density may arise because installation of a blower requires a space and expenses. To overcome these disadvantages, the aforesaid airtightly enclosed inner circulation system adopts a structure in which the entire mechanism is accommodated in airtight means with no gas being supplied from the exterior. In the inner circulation system, however, gas is likely to flow from the upstream side of a transducer support inserted into the gaps between the adjacent disks into a drive-mechanism housing constituting one part of the airtight enclosure, and this flow of gas, in turn, reverses from the downstream side of the transducer support to a rotating-disk housing constituting the other part of the airtight enclosure. As a result, dust generated from drive means, in particular, guide means and a coil, may enter the rotating-disk housing and flow into the gaps between the rotating disks and the corresponding transducers, thus resulting in crash accidents. Where a filter for filtering gas is provided in the drive-mechanism housing so as to circulate clean air within the rotating-disk housing, there is a problem in that the level of pressure in the drive-mechanism housing increases owing to pressure loss at the filter and thus amplifies the aforesaid reverse flow.

SUMMARY OF THE INVENTION

It is therefore an object of the present invention to provide a highly reliable rotating disk storage device which has a structure constituted by an airtight enclosure containing rotating disks and a drive mechanism and in which no contaminated gas enters a rotating disk storage housing of the airtight enclosure.

A primary feature of the present invention resides in a rotating disk storage device comprising separating means for separating airtight enclosure into a rotating-disk housing and a drive-mechanism housing; a first opening for allowing gas to be discharged from the rotating-disk housing to the drive-mechanism housing and for allowing a transducer support to be moved therethrough; a second opening for allowing gas to be discharged from the drive-mechanism housing to the rotating-disk housing through a discharge provided with a filter; and a flow resisting arrangement for hindering the flow of gas from the first opening to the second opening in the rotating-disk housing.

In this construction, the pressure within the drive-mechanism housing of the airtight enclosure is less likely to be affected by the pressure generated upstream of the transducer support on the side of the rotating-disk housing. Therefore, a major part of gas discharged from the rotating-disk housing is allowed to flow into the drive-mechanism housing through the portion of the first opening downstream of the transducer support. The resultant gas flow cools a drive mechanism, is filtered by the filter of the discharge, and is then discharged through the second opening into the rotating-disk housing.

Further objects, features and advantages of the present invention will become apparent from the following description of preferred embodiments of the present invention with reference to the accompanying drawings.

DESCRIPTION OF THE PREFERRED EMBODIMENTS

In the disclosed embodiments, a plurality of magnetic disks are fitted in an upright orientation onto a horizontally extending spindle, and a corresponding number of transducers are disposed for movement in face-to-face relationship with surfaces of the magnetic disks movable in the radial direction thereof.

A first embodiment will be described in detail below with reference to FIGS. 1 to 3.

Figure 1:
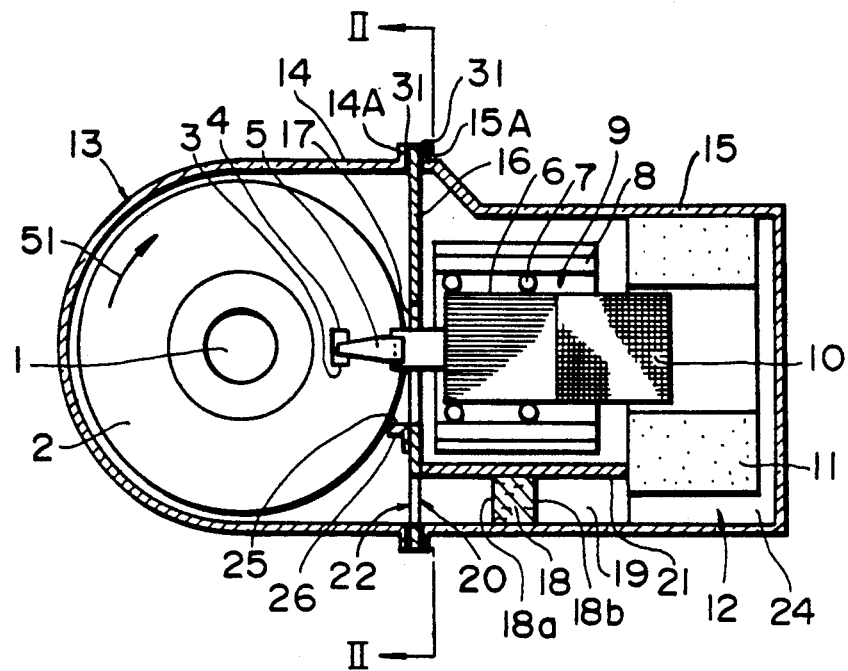
FIG. 1 is a diagrammatic side elevation, in cross section, of a first preferred embodiment of the present invention.

A plurality of magnetic disks 2 are fitted onto a spindle 1 for rotation about the axis of the spindle 1 in the direction indicated by an arrow 51 of FIG. 1. Transducers 3 are attached to sliders 4 which, in turn, are connected to a carrier 6 by a transducer support 5. The carrier 6 is guided by guide means 9 constituted by ball bearings 7 and guide rails 8 to restrict the movement of each of the transducers 3 to radial movement over the corresponding surface of the magnetic disk 2. This carrier means 6 is arranged to be moved along an axis parallel to the radial direction of the magnetic disks 2 by drive means 12 consisting essentially of a coil 10 and a permanent magnet 11. The entire, above-described mechanism is enclosed by an airtight enclosure 13. The magnetic disks 2 and associated parts are accommodated in a rotating-disk housing 14, and the guide means 9, the drive means, and associated parts are accommodated in a drive-mechanism housing 15. The rotating-disk housing 14 is separated from the drive-mechanism housing 15 by a first separating partition 16. The airtight enclosure 13 is constituted by the magnetic-disk housing 14 and the drive-mechanism housing 15 which are formed separately from each other. These housings 14 and 15 are respectively provided with flanges 14A and 15A which allow the housings 14 and 15 to be integrally connected together, for example, by bolts and nuts. The peripheral edge of the first separating partition 16 is located between the respective flanges 14A and 15A of the housings 14 and 15, with a seal member 31 interposed therebetween. Thus, the housings 14 and 15 can be rigidly connected together to obtain sealing therebetween.

The first separating partition 16 is provided with a first opening 17. The first opening 17 allows transducer supporting means 5 to be moved therethrough along an axis parallel to the radial direction of the magnetic disks 2, and allows gas to be discharged from the rotating-disk housing 14 to the drive-mechanism housing 15. The first opening 17 is located such that the area of the portion of the first opening 17 upstream of the transducer support 5 (the area of a region D in FIG. 2) is smaller than the area of the portion of the same downstream of the support 5 (the area of a region E in FIG. 2). A second separating partition 21 is located at a position parallel to the above-mentioned drive mechanism for the carrier 6 within the drive-mechanism housing 15. The second separating partition 21 cooperates with the inner wall of the drive-mechanism housing 15 to define a flow passage 19. The flow passage 19 includes a filter 18 for filtering gas, and an outlet 18a of the filter 18 communicates with a second opening 20 formed in the first separating partition 16. The second separating partition 21 is airtightly attached to the first separating partition 16 and the inner wall of the drive-mechanism housing 15 with the seal member 31 interposed therebetween, so that the airtightness of the flow passage 19 is maintained. The second separating partition 21 provides separation of a portion extending from the outlet 18a of the filter 18 to the second opening 20 and the remaining portion of the drive-mechanism housing 15. Thus, a discharge 22 is constituted by a combination of the filter 18, the second opening 20, and the second separating partition 21. The filter 18 has an inlet 18b which communicates with the rear surface of the drive means 12 via a flow passage 24. On the side of the rotating-disk housing 14 of the airtight enclosure 13, a first flow resistor 26 is located on the portion of the first separating partition 16 which is defined between a downstream edge 25 of the first opening 17 and the second opening 20. One edge of the first flow resistor 26 is located in immediate proximity to the outer circumferences of the magnetic disks 2. The length of the first flow resistor 26 parallel to the axis of the spindle 1 is preferably equal to at least the distance between magnetic disks 2a and 2b which are located on axially opposite sides of the spindle. Accordingly, in the presently preferred embodiment, that length is determined in correspondence with the distance between the wall surfaces of the rotating-disk housing 14 at opposite ends of the spindle.

Figure 2:
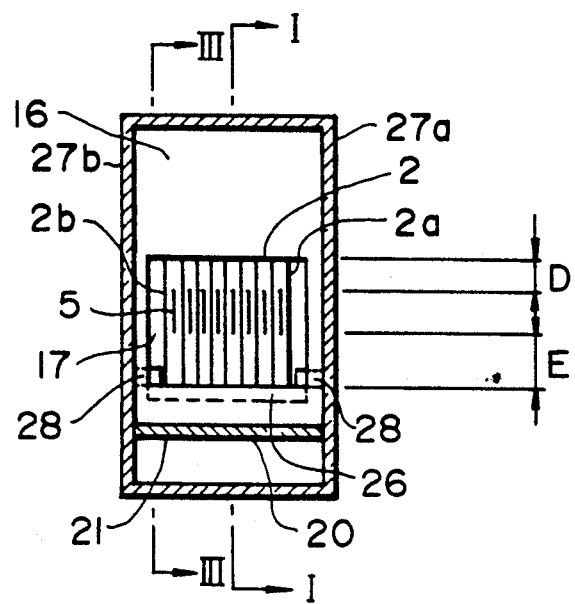
FIG. 2 is a diagrammatic cross section taken along the line II—II of FIG. 1.
Figure 3:
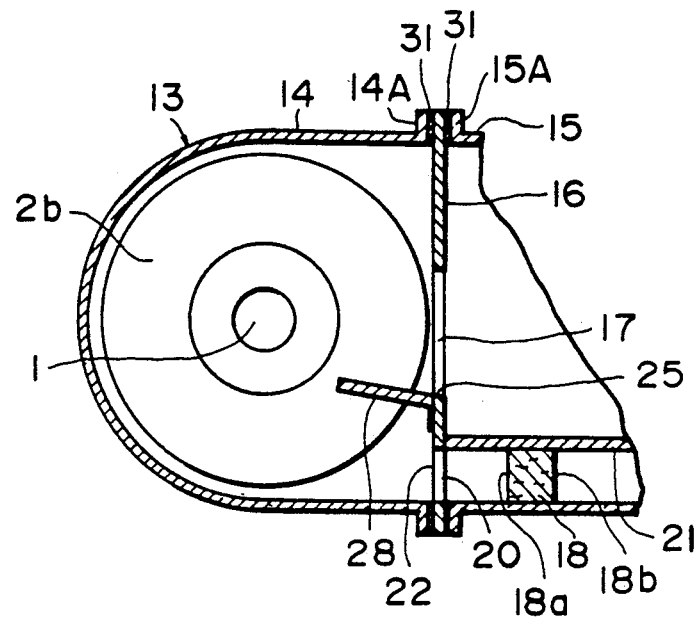
FIG. 3 is a fragmentary cross section taken along the line III—III of FIG. 2.

As shown in FIGS. 2 and 3, each second flow resistor 28 is provided at an intermediate position between the above-mentioned magnetic disk 2a and a side wall 27a of the rotating-disk housing 14 constituting the airtight enclosure 13 as well as at an intermediate position between the other magnetic disk 2b and a side wall 27b of the housing 14. Similar to the first flow resistor 26, these second flow resistor 28 are also located on the portion of the first separating partition 16 which is defined between the downstream edge 25 of the first opening 17 and the second opening 20. Each second flow resistor 28 extends at its one end in the radial direction of the magnetic disk 2 beyond a tip end of the first flow resistor 26. The second flow resistor 28 and the axially-opposite magnetic disks 2a and 2b define clearances therebetween along the axis of the spindle 1.

The second flow resistors 28, which are formed independently of the first flow resistor 26, are secured to the side walls 27a and 27b of the rotating-disk housing 14, thus being located at the above-described positions. Instead of the separate construction, the second flow resistors 28 may be formed integral with the first flow resistor 26

Figure 4:
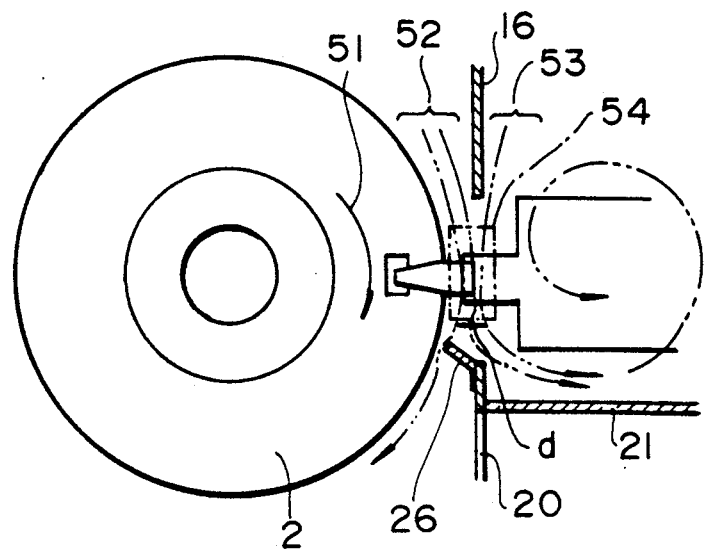
FIG. 4 is a schematic illustration of the flow of gas in the structure shown in FIGS. 1 to 3.

In this construction, when the plurality of magnetic disks 2 are caused to rotate in the direction indicated by an arrow 51 in FIG. 1, gas present between adjacent magnetic disks 2 is caused to flow in the same direction as the rotation of the magnetic disks 2. As shown by gas-flow lines 52 in FIG. 4, gas near the first separating partition 16 on the side of the rotating-disk housing 14 is also caused to flow in the direction of rotation of the magnetic disks 2. On the side of the drive-mechanism housing 15, this gas flow causes gas near the first separating partition 16 to flow as shown by the gas-flow lines 53 in FIG. 4, that is, along the flow shown by the gas-flow lines 53. The gas flow shown by the gas-flow lines 52 and 53 is mixed in an mixture area 54 located in the first opening 17 to form a mixed gas flow. The mixed gas flow is hindered by the first and second flow resistors 26 and 28.

In this manner, the pressure within the drive-mechanism housing 15 constituting the airtight enclosing means 13 is less likely to be affected by the pressure generated upstream of the transducer support 5. Therefore, a major part of gas discharged from the rotating-disk housing 14 of the airtight enclosure 13 is allowed to flow into the drive-mechanism housing 15 through the portion of the first opening 17 downstream of the transducer support 5.

The level of pressure at the second opening 20 constituting the discharge 22 is made sufficiently lower than the level of pressure at the first opening 17 which acts to discharge gas. Therefore, an increased amount of gas is allowed to flow into the drive-mechanism housing 15 through the first opening 17 for the discharge of gas, whereby gas is prevented from flowing in a reverse direction.

Each of the second flow resistors 28 extends in the radial direction of the magnetic disks 2 a distance more than the first flow resistor 26. This acts to increase the level of pressure in the portion of the flow passage which is defined between the magnetic disks 2 and the stationary wall of the rotating-disk housing 14, i.e., the portion facing the first opening 17 which serves as a discharge port. Thus, the high-pressure gas flow in flow passages between the magnetic disks 2 is prevented from reversing toward the flow passage between the stationary wall and the magnetic disks 2.

In this manner, it is possible to eliminate gas flow which might bypass the filter 18 and flow backward from the drive-mechanism housing 15 to the rotating-disk housing 14.

In accordance with the first embodiment, the gas flow discharged from the rotating-disk housing 14 through the first opening 17 to the drive-mechanism housing 15 can be completely recirculated to the rotating-disk housing 14 through the filter 18 and the discharge 22. It is therefore possible to prevent the occurrence of a crash accident typically caused by contaminated gas containing dust which flows back into the rotating-disk housing 14, thereby providing an air-tightly enclosed magnetic disk storage device with high reliability. Accordingly, a reduction in cost and an improvement in space storage density are effectively achieved since external gas circulating structure can be saved.

It will be appreciated by those skilled in the art that even in magnetic disk storage devices of an external gas-circulation type the present invention causes a positive gas flow from the rotating-disk housing to the drive-mechanism housing without any reverse flow.

Figure 6:
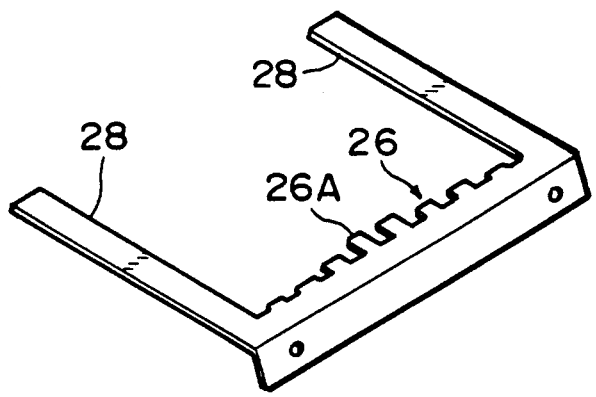
FIG. 6 is a perspective view of one embodiment of the flow resisting means in the present invention.
Figure 7:
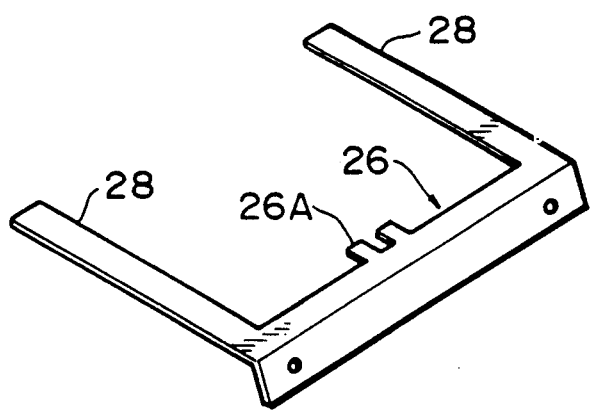
FIG. 7 is a perspective view of another embodiment of the flow resisting means in the present invention.
Figure 8:
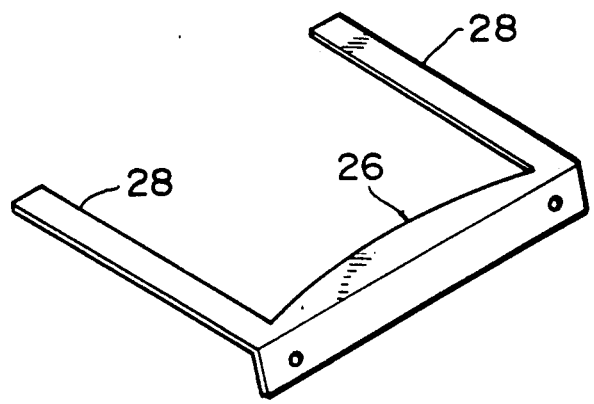
FIG. 8 is a perspective view of still another embodiment of the flow resisting means in the present invention.
Figure 9:
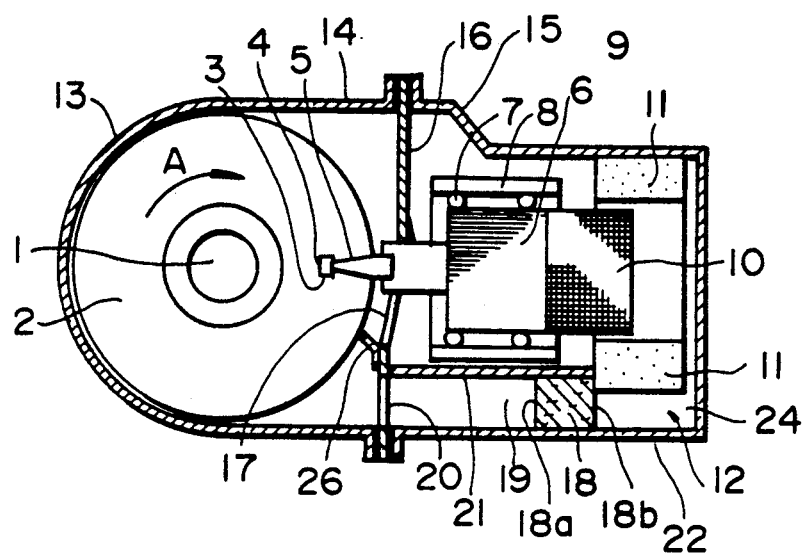
FIG. 9 is a diagrammatic side elevation, in corss section, of a second preferred embodiment of the present invention.

FIGS. 6, 7 and 8 illustrate, in perspective, other embodiments of the first and second flow resistors 26 and 28 in the present invention.

In the illustrated embodiments, the first flow resistors 26 is formed integral with the second flow resistor 28. The first flow resistor 26 is formed such that its length extending in the radial direction of the magnetic disk progressively increases from the axially-opposite ends of the resistor 26 toward a middle portion of the same.

In the above-described first embodiment, the transducer support 5 includes a support for a transducer responsible for positioning and support for the other transducers for reading and writing data. The size of the positioning transducer support is made slightly larger than the sizes of the read/write transducer support because of importance of the positioning function. For this reason, the degree of pressure drop downstream of the positioning transducer support is greater than that at other portions. In general, such a transducer responsible for positioning is significantly sensitive to off-tracing due to heat deformation of the device. For this reason, there is a tendency for this transducer to be located near a middle position, in the direction in which the magnetic disks 2 are arranged in side-by-side relationship. The first embodiment is constructed in such a manner.

Figure 5:
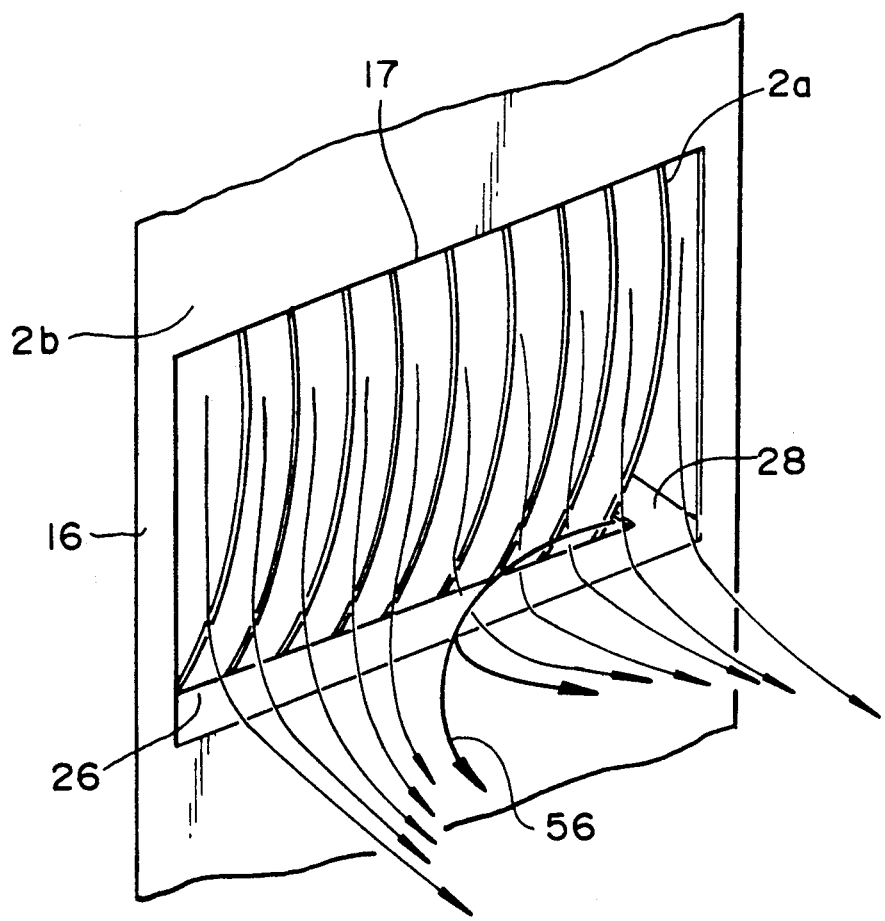
FIG. 5 is a view illustrating the cause of formation of pressure distribution about a middle portion of flow resisting means.

Such an unbalance of pressure relative to the above-mentioned direction of arrangement of the magnetic disks 2 at the position of the flow resistors may be produced by various other causes. For instance, the unbalance of pressure may be caused by the fact that the level of pressure between the stationary wall and the magnetic disks is lower than that at the other portions. In addition, the unbalance of pressure may occur even in an instance where a transducer support of the same overall shape are employed instead of transducer support, such as the above-described ones, having a specially-shaped portion. In order to obtain a sufficient degree of flow resistance provided by the second flow resistors 28 to compensate for the pressure drop between the stationary wall and the magnetic disks 2, the level of the pressure distributed at the downstream edge of the first opening 17 near which the second flow resistors 28 are located must be made higher than that of the pressure distributed at the position where the first flow resistor 26 is located. Therefore, secondary flows 56 such as those shown in FIG. 5 are induced on the side of the drive-mechanism housing 15, with the result that the unbalance of pressure is amplified. In FIG. 2, moreover, the rotating-disk housing 14 is apparently horizontally symmetrical with respect to a center line normal to the axis of the spindle 1. However, the housing 14 is slightly asymmetrically formed in the horizontal direction from limitations upon assembly of the device. Therefore, the unbalance of pressure appears asymmetrically in the horizontal direction as viewed in FIG. 2.

It is to be noted that each of the present examples illustrated in FIGS. 6 to 8 has a horizontally symmetrical form since the degree of such horizontal asymmetry is small enough to be ignored. However, in an instance where a significant degree of asymmetrical unbalance of pressure is present, each flow resisting means may of course have a form capable of producing an asymmetrical flow resisting effect.

In the example illustrated in FIG. 6, the first flow resistor 26 has a multiplicity of teeth 26A. The teeth 26A are formed such that their projecting lengths progressively increase from opposite sides to a middle portion. In particular, the tooth 26A formed at the center has a width dimension which allows the same to be properly inserted into the gap between the magnetic disks.

In this example, it is a primary object of the tooth 26A to adjust the balance of pressure relative to the direction in which the magnetic disks 2 are arranged in side-by-side relationship. Accordingly, in an instance where an excessively large rate of circulation is not needed, the teeth 26A may be partially formed as the first flow resistor 26 as shown in FIG. 7, or the first flow resistor 26 may be formed in an as shown in FIG. 8 such that the middle portion extends toward the magnetic disks 2. In either case, a similar effect can be attained.

Figure 10:
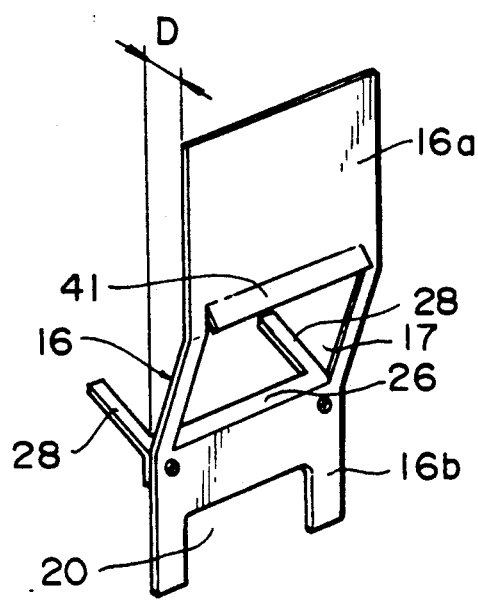
FIG. 10 is a perspective view used for illustrating in detail a portion of the embodiment of FIG. 9.

A second preferred embodiment of the present invention will be described below with reference to FIGS. 9 to 13. In the second embodiment, like reference numerals are used to denote like or corresponding elements relative to those shown in FIG. 1. The first separating partition 16 for providing for separation of the rotating-disk housing 14 and the drive-mechanism housing 15, as shown in FIG. 10, is constituted by a plurality of surfaces which are normal to the direction of movement of the first transducer support 5. More specifically, a flat portion 16a upstream of the first opening 17 is shifted a predetermined distance (a distance D in FIG. 10) from a downstream flat portion 16b into the drive-mechanism housing 15, thereby constituting a structure capable of accelerating the discharge of gas. In addition, the first separating partition 16 has a slant portion 41 constituted by a lower edge of the upstream flat portion 16a which is bent slightly toward the dirve-mechanism housing 15.

The first separating partition 16 further includes the first flow resistor 26 and the second flow resistors 28 which are located at the upper edge of the downstream flat portion 16b.

Figure 11:
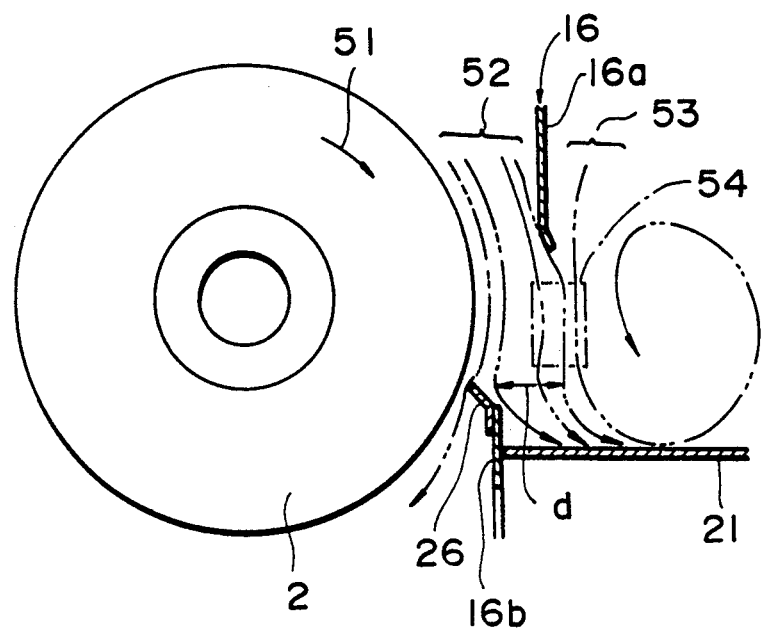
FIG. 11 is a schematic illustration of the flow of gas in the structure shown in FIGS. 9 and 10.

Referring to FIG. 11 which illustrates the flow of gas in the structure shown in FIG. 10, when the magnetic disk 2 is caused to rotate in the direction indicated by the arrow 51, gas in the rotating-disk housing 14 is caused to flow as shown by the gas-flow lines 52, that is, in the direction of rotation of the magnetic disk 2. In the drive-mechanism housing 15, the gas flow represented by the gas-flow lines 53 is induced by the above-mentioned gas flow. These gas flows represented by the lines 52 and 53 are mixed together in the mixture area 54 located in the first opening 17 to form a mixed gas flow. A major part of the mixed gas flow passing through the mixture area 54 flows into the drive-mechanism housing 15 since the distance D is established between the upstream flat portion 16a of the first separating partition 16 and the downstream flat portion 16b.

In addition, the slant portion 41 located along the lower edge of the upstream flat portion 16a acts to shift the mixture area 54 into the drive-mechanism housing 15 with respect to the plane of the upstream flat portion 16a. Accordingly, the above-mentioned effect of introducing gas into the drive-mechanism housing 15 is further improved so that gas is prevented from flowing backward from the drive-mechanism housing 15 through the first opening 17 into the rotating-disk housing 14.

Figure 12:
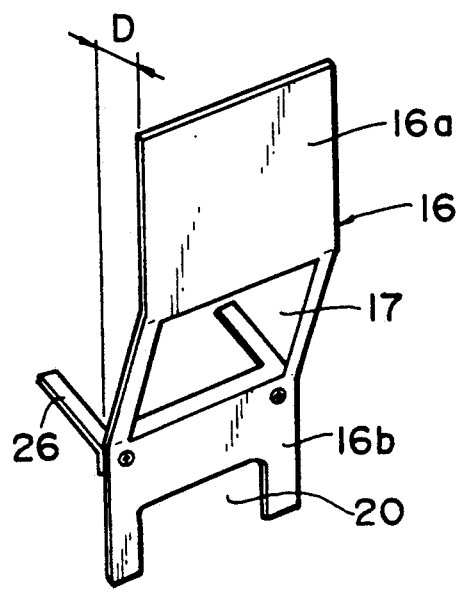
FIG. 12 is a perspective view of one embodiment of a first separating means in the present invention.
Figure 13:
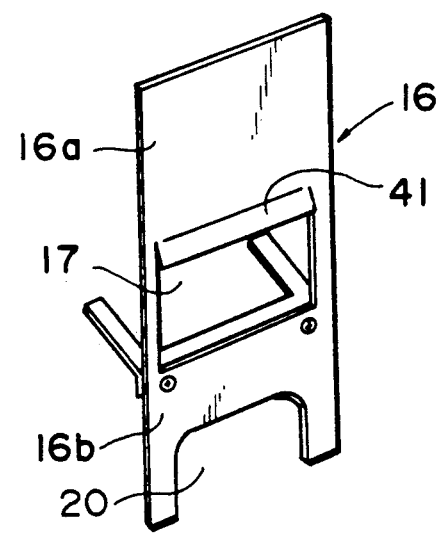
FIG. 13 is a perspective view of another embodiment of the first separating means in the present invention.

FIGS. 12 and 13 illustrate modified forms of the structure for accelerating the discharge of gas shown in FIG. 10.

The structure shown in FIG. 12 is such that the upstream flat portion 16a of the first separating partition 16 is shifted a distance D from the downstream flat portion 16b.

The structure shown in FIG. 13 is such that the upstream flat portion 16a of the first separating partition 16 is flush with the downstream flat portion 16b and the slant portion 41 is provided along the lower edge of the upstream flat portion 16a.

The structure such as that shown in FIG. 12 enables a major part of gas flowing downstream of the transducer supporting means to flow into the drive-mechanism housing 15. The structure shown in FIG. 13 enables gas from the rotating-disk housing 14 to flow along the upstream flat portion 16a of the first separating means 16 into the drive-mechanism housing 15, on the upstream side of the transducer support.

The above-described flow resistors provided at the lower edge of the first opening hinders gas from flowing on the side of the magnetic disks and adjusts the balance of pressure distributed along the flow resistors, thereby preventing the reverse flow of gas. However, the gas flow formed in this instance is substantially parallel to the direction of rotation of the magnetic disks on the slightly upstream side of the flow resisting means, but a portion of gas flowing extremely closely to the outer circumferences of the magnetic disks is mixed with gas flowing from the drive-mechanism housing to form a mixed gas flow. Accordingly, an angle at which the flow resistor is provided becomes important in preventing the mixed gas flow from flowing in reverse into the rotating-disk housing. For instance, in order to introduce into the drive-mechanism housing the gas flowing nearer to the tip of the portion of the flow resistor which extends in the radial direction of the magnetic disks, the above-mentioned angle may be designed so that the flow resistor is inclined at a further sharp angle with respect to the main stream of gas. In general, it is effective to incline the flow resistor at least upstream of a line drawn between the rotation axis of the magnetic disks and a position at which the flow resistor is provided.

Figure 14:
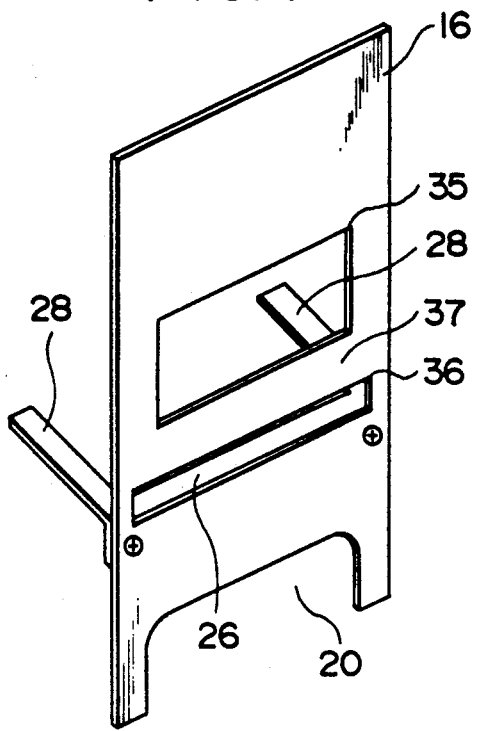
FIG. 14 is a perspective view of another embodiment of the first separating means in the present invention.

FIG. 14 is a perspective view of an another example of the first separating partition in the present invention.

An explanation so far clearly shows that the most of the gas flowing out from the rotating disk housing 14 to the drive-mechanism housing 15 through said first separating partition flows out from a small part near down stream side edge of said first opening 17.

Therefore, in an example in FIG. 14, the first separating partition 16 has a third opening 35 for allowing the transducer support 5 to be moved through said first separating partition 16 and a forth opening 36 for allowing gas to be discharged from the rotating-disk housing to the drive-mechanism housing.

An intermediate wall 37 between the third opening 35 and the forth opening 36 prevents the mixing phenomena of the gas flow in the rotating disk housing 14 with the gas in the drive-mechanism housing 15 and also prevents a dust from entering into said rotating disk housing 14.

The assembling of said rotating disk storage device is made easy by separating said first separating partition 16 into two parts along the down stream side edge of the third opening 38.

Figure 15:
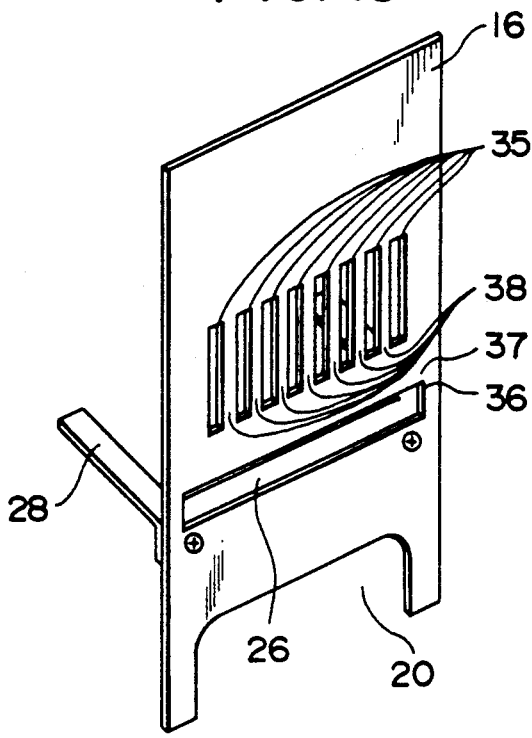
FIG. 15 is a perspective view of another embodiment of the first separating means in the present invention.

FIG. 15 is a perspective view of an another embodiment of the first separating partition 16.

In this example of the present invention, the third opening 35 is composed of plural windows for allowing individual transducer supports 5 to be moved through each of the windows.

Pillars 38 between each of the windows prevent both pressure drop in the rotating disk housing 14 and pressure rise in the drive-mechanism housing 15 due to gas that flows out from the rotating disk housing 14 to the drive-mechanism housing 15 through the third opening 35.

The above described effects to prevent the pressure drop in the rotating disk housing and the pressure rise in the drive-mechanism housing 15 increase gas flow from the forth opening 36.

The windows in FIG. 15 can be made so as to allow individual transducer supports 5 to be moved through individual windows.

Figure 16:
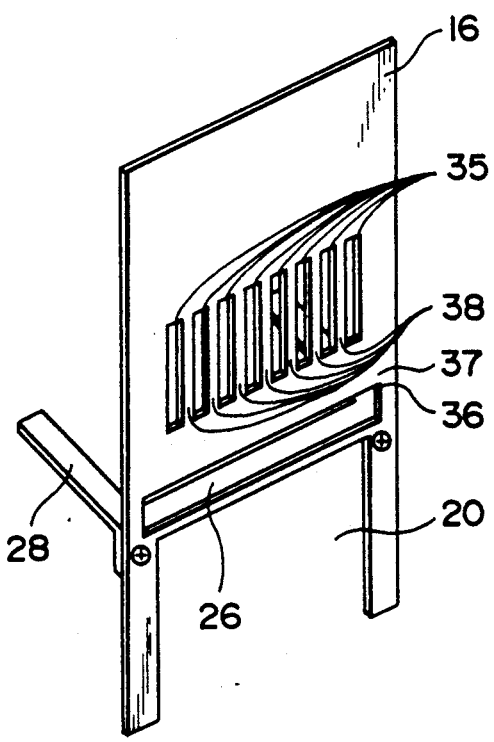
FIG. 16 is a perspective view of another embodiment of the first separating means in the present invention.

FIG. 16 is a perspective view of an another embodiment of the first separating partition 16.

The forth opening 36 and the second opening 20 in FIG. 16 are closer to each other with the first flow resistor 26 acting as a barrier.

The effect of pressure drop in the down steam region of the first flow resistor 26 and the second flow resistors 28 is used more effectively than in aforementioned example of this invention.

Figure 17:
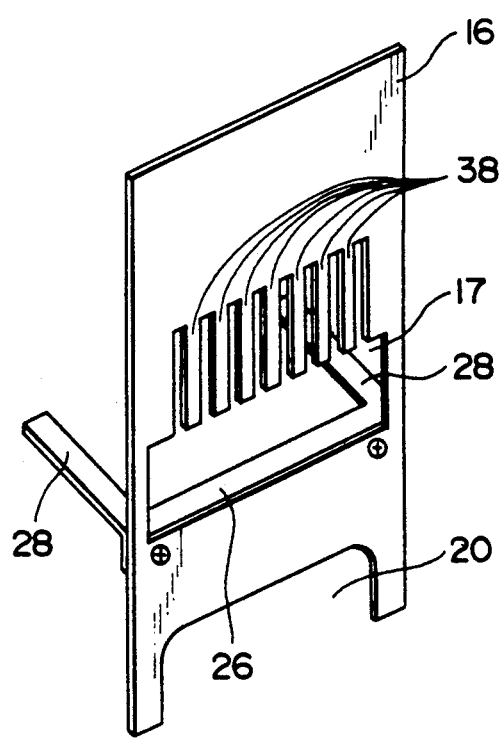
FIG. 17 is a perspective view of another embodiment of the first separating means in the present invention.

FIG. 17 is a perspective view of an another embodiment of the first separating partition 16. The structure in FIG. 17 is such that the first opening 17 in FIG. 2 is divided into plural windows. The effects of plural pillars 38 between each of the windows is the same as that of the example shown in FIG. 15.

It will be appreciated from the foregoing that the present invention provides a highly reliable storage device in which no contaminated gas containing dust enters the rotating-disk housing.

What is claimed is:

1. A rotating disk storage device, comprising a plurality of disks fitted onto a spindle, transducers supported for movement in face-to-face relationship with surfaces of said disks, means for supporting said transducers, means for moving said transducer supporting means in a predetermined direction, means for airtightly enclosing the disks, the transducers, the supporting means and the moving means,
    means for separating said airtight enclosing means into a rotating disk housing and a drive-mechanism housing;
    means for discharging gas which flows into said drive-mechanism housing into said rotating disk housing;
    means operatively arranged at said discharging means for filtering the gas flowing from said drive-mechanism housing to said rotating disk housing;
    a first opening associated with said separating means for allowing gas to be discharged from said rotating-disk housing to said drive-mechanism housing and for allowing said transducer supporting means to be moved therethrough;
    a second opening associated with said separating means for allowing said gas which flows into said drive-mechanism housing to be discharged through said discharge means provided with filter means into said rotating-disk housing; and
    means for resisting the flow of said gas from said first opening to said second opening in said rotating-disk housing, wherein said flow resisting means comprises first flow resisting means disposed between respective disks and second flow resisting means disposed between stationary wall surfaces of said airtight enclosing means and the disks such that said second flow resisting means causes a greater flow resistance than said first flow resisting means.

2. A rotating disk storage device according to claim 1, wherein said discharge means includes a flow passage defined by separating means provided in said drive-mechanism housing with said filtering means provided in said flow passage, an inlet of said filter means in said flow passage communicating with said first opening via a drive mechanism with an actuator coil cooled by the gas flows and an outlet of said filter means in said flow passage communicating with said second opening.

3. A rotating disk storage device according to claim 1, wherein said first flow resisting means is integral with said second flow resisting means.

4. A rotating disk storage device according to claim 1, wherein said discharge means includes separating means provided in said drive-mechanism housing for defining a flow passage; and filtering means provided in said flow passage, with an inlet of said filter means in said flow passage communicating with said first opening via a drive mechanism and an outlet of said filter means in said flow passage communicating with said second opening.

5. A device according to claim 1, wherein said first flow resisting means has teeth inserted into flow passages defined between said disks by distances smaller than distances by which said second flow resisting means has teeth inserted into flow passages defined between said disks and walls.

6. A device according to claim 1, wherein teeth on said first flow resisting means have portions which are inserted into flow passages defined between said disks smaller in width than portions of teeth on said second flow resisting means, which are inserted into flow passages defined between said disks and walls.

7. A device according to claim 1, wherein teeth on said first flow resisting means have portions which are inserted into flow passages defined between said disks smaller in area than portions of teeth on said second flow resisting means which are inserted into flow passages defined between said disks and walls.

8. A device according to claim 1, wherein a ratio of a width of portions of teeth on said first flow resisting means which are inserted into flow passages defined between said disks to a spacing between said disks is smaller than a ratio of a width of portions of teeth on said second flow resisting means which are inserted into flow passages defined between said disks and stationary walls to a spacing between said disks and walls.

9. A device according to claim 1, wherein a ratio of an area of a portion of said second flow resisting means which is provided or inserted into a flow passage defined by an outer diameter of disks, an outer diameter of hubs of disks, disks on the opposite ends of a row of disks and walls facing said disks on the opposite ends, to an area of said flow passage is larger than a ratio of an area of a portion of said first flow resisting means which is inserted into a flow passage defined by an outer diameter of disks, an outer diameter of hubs of disks and two rotating disks, to an area of said latter flow passage.

10. A rotating disk storage device, comprising a plurality of disks fitted onto a spindle, transducers supported for movement in face-to-face relationship with surfaces of said disks, means for supporting said transducers, means for causing said transducer supporting means to move in a predetermined direction, airtight enclosing means for airtightly enclosing the disks, the transducers, the supporting means and the moving means,
    a first means for separating said airtight enclosing means into a rotating-disk housing and a drive-mechanism housing;
    a first opening associated with said first separating means for allowing gas to be discharged from said rotating-disk housing to said drive-mechanism housing and for allowing said transducer supporting means to be moved therethrough located such that a portion of said first opening upstream of said transducer supporting means has an area smaller than a portion of the said first opening downstream of said transducer supporting means;
    a second means in said drive-mechanism housing for separating said airtight enclosing means to form a discharge provided with filter means;
    a second opening associated with said first separating means for allowing said gas which flows into said drive-mechanism housing to be discharged through said discharge into said rotating-disk housing; and
    means for resisting the flow of gas from said first opening to said second opening in said rotating-disk housing, comprising first flow resisting means located in the vicinity of the outer circumference of said plurality of disks constituting a disk group and between respective disks, and second flow resisting means formed integral with said first flow resisting means and located between disks disposed on opposite side of said disk group and side walls of said airtight enclosing means facing said disks so as to cause greater flow resistance than said first flow resisting means.

11. A rotating disk storage device, comprising a plurality of disks fitted onto a spindle, transducers supported for movement in face-to-face relationship with surfaces of said disks, means for supporting said transducer, means for causing said transducer supporting means to move in a predetermined direction, and means for airtightly enclosing the disks, the transducers, the supporting means and the moving means,
- a first means for separating said airtight enclosing means into a rotating-disk housing and a drive-mechanism housing;
- a first opening associated with said first separating means for allowing gas to be discharged from said rotating-disk housing to said drive-mechanism housing and for allowing said transducer supporting means to be moved therethrough;
- a second means in said drive-mechanism housing for separating said airtight enclosing means to form a discharge provided with filter means;
- a second opening associated with said first separating means for allowing said gas which flows into said drive-mechanism housing to be discharged through said discharge into said rotating-disk housing; and
- means for resisting the flow of gas from said first opening to said second opening in said rotating-disk housing, including first flow resisting means located in the vicinity of the outer circumference of said plurality of disks constituting a disk group, and second flow resisting means located between disks disposed on opposite sides of said disk group and side walls of said airtight enclosing means facing said disks, said first flow resisting means exhibiting a balance of pressure in which its flow resisting effect is larger around a lengthwise mid portion but smaller at lengthwise opposite ends.

12. A rotating disk storage device according to claim 11, wherein said first flow resisting means includes a comb-shaped edge having a plurality of teeth opposing the outer circumference of said disk group, with each tooth opposing a respective space between said disks.

13. A rotating disk storage device according to claim 11, wherein said first flow resisting means includes an edge opposing the outer circumference of said disk group and formed in an arc such that a middle portion of said edge is nearer to the axis of rotation of said disk group, with opposite lengthwise end portions of said edge being more remote from said axis of rotation.

14. A rotating disk storage device according to claim 11, wherein said first flow resisting means is formed integral with said second flow resisting means.

15. A device according to claim 11, wherein a longitudinally central tooth on said first flow resisting means is inserted into flow passages defined between said disks by a distance smaller than those by which teeth on the opposite ends of said first flow resisting means are inserted into flow passages defined between said disks.

16. A device according to claim 11, wherein a portion of a longitudinally central tooth on said first flow resisting means which is inserted into a flow passage defined between said disks is larger in width than portions of teeth on the opposite ends of said first flow resisting means which are inserted into flow passages defined between said disks.

17. A device according to claim 11, wherein a portion of a longitudinally central tooth on said first flow resisting means which is inserted into flow passages defined between said disks is larger in area than portions of the opposite teeth on said first flow resisting means which are inserted into flow passages defined between said disks.

18. A device according to claim 11, wherein a ratio of a width of a portion of a central tooth on said first flow resisting means which is inserted into a flow passage defined between said disks to a spacing between said disks is larger than a ratio of a width of portions of teeth on the opposed ends of said first flow resisting means which are inserted into flow passages defined between said disks to a width of a flow passage defined between said disks.

19. A device according to claim 11, wherein a ratio of an area of a portion of a longitudinally central tooth on said second flow resisting means which is inserted into a flow passage defined by an outer diameter of disks, an outer diameter of hubs of said disks and two rotating disks to an area of said flow passage is larger than a ratio of an area of portions of teeth on longitudinally opposite ends on said second flow resisting means which are inserted into said flow passage.

20. A rotating disk storage device, comprising:
- a plurality of disks fitted onto a spindle, transducers supported for movement in face-to-face relationship with surfaces of said disks, means for supporting said transducers, means for causing said transducer supporting means to move in a predetermined direction, and airtight enclosing means for airtightly enclosing the disks, the transducers, the supporting means and the moving means;
- means for separating said airtight enclosing means into a rotating-disk housing and a drive-mechanism housing;
- a first opening associated with the separating means for allowing gas to be discharged from said rotating-disk housing to said drive-mechanism housing and for allowing said transducer supporting means to be moved therethrough; and
- a second opening associated with the separating means for allowing said gas which flows into said drive-mechanism housing to be discharged into said rotating-disk housing through a discharge provided with filter means; wherein said separating means and said first opening are for accelerating the flow of gas from said rotating-disk housing through said first opening to said drive-mechanism housing, said separating means comprising a plurality of surfaces perpendicular to a direction of movement of said transducer supporting means, one of said surfaces being a flat surface upstream of said first opening of said separating means and displaced toward said drive-mechanism housing from another of said surfaces being a flat surface downstream of said first opening of said separating means.

21. A rotating disk storage device according to claim 20, wherein said flat surface upstream of said first opening in said separating means has a slant portion which extends along one edge of said first opening and is bent toward said drive-mechanism housing.

22. A rotating disk storage device, comprising:
a plurality of disks fitted onto a spindle, transducers supported for movement in face-to-face relationship with surfaces of said disks, means for supporting said transducers, means for causing said transducer supporting means to move in a predetermined direction, and airtight enclosing means for airtightly enclosing the disks, the transducers, the supporting means and the moving means;
means for separating said airtight enclosing means into a rotating-disk housing and a drive-mechanism housing;
a first opening associated with the separating means for allowing gas to be discharged from said rotating-disk housing to said drive-mechanism housing and for allowing said transducer supporting means to be moved therethrough; and
a second opening associated with the separating means for allowing said gas which flows into said drive-mechanism housing to be discharged into said rotating-disk housing through a discharge provided with filter means, wherein said separating means and said first opening are for accelerating the flow of gas from said rotating-disk housing through said first opening to said drive-mechanism housing, said separating means being arranged in a single plane perpendicular to the direction of movement of said transducer supporting means, with a flat portion upstream of said first opening in said separating means having a slant portion which extends along one edge of said first opening and is bent toward said drive-mechanism housing.

23. A rotating disk storage device, comprising a plurality of disks fitted onto a spindle, transducers supported for movement in face-to-face relationship with said disks, means for supporting said transducers, means for moving said transducer supporting means in a predetermined direction, and means for enclosing said disks, transducers, supporting means and moving means, means for separating said enclosing means into a rotating disk housing and a drive-mechanism housing;
a first opening provided in said separating means for allowing gases to be discharged from said rotating disk housing to said drive-mechanism housing and for allowing said transducer supporting means to be moved therethrough;
a second opening provided in said separating means for allowing gases having flown into said drive-mechanism housing to pass through a discharge provided with a filter into said rotating disk housing; and
means for effecting flow resistance provided between said first and second openings on a side of said rotating disk housing so as to be disposed in flow passages defined between opposite ends of the plurality of disks and stationary wall surfaces facing the opposite ends of the plurality of disks.

24. A rotating disk storage device having a plurality of disks fitted onto a spindle, transducers supported for movement in face-to-face relationship with surfaces of said disks, means for supporting said transducers, means for causing said transducer supporting means to move in a predetermined direction, and means for airtightly enclosing the disks, transducers, supporting means and moving means,
first means for separating said airtight enclosing means into a rotating-disk housing and a drive-mechanism housing;
a first opening associated with the first separating means for allowing gas to be discharged from said rotating-disk housing to said drive-mechanism housing and for allowing said transducer supporting means to be moved therethrough;
second means disposed in said drive-mechanism housing for forming a discharge provided with means for filtering;
a second opening associated with the first separating means for allowing said gas which flows into said drive-mechanism housing to be discharged through said discharge into said rotating-disk housing; and
means for resisting the flow of gas from said first opening to said second opening in said rotating-disk housing, including first flow resisting means which is located in the vicinity of the outer circumferences of said plurality of disks constituting a disk group and second flow resisting means located between disks disposed on opposite sides of said disk group and side walls of said airtightly enclosing means facing said disks, said first flow resisting means being configured and arranged such that it produces a flow resisting effect larger around a lengthwise mid portion than at lengthwise opposite ends thereof, and said second flow resisting means produces a flow resisting effect larger than the effect produced near the opposite ends of said first flow resisting means.

25. A rotating disk storage device having a plurality of disks fitted onto a spindle, transducers supported for movement in face-to-face relationship with surfaces of said disks, means for supporting said transducers, means for causing said transducer supporting means to move in a predetermined direction, and means for airtightly enclosing the disks, transducers, supporting means and moving means,
means for separating said airtight enclosing means into a rotating disk housing and a drive-mechanism housing;
a third opening associated with the separating means for allowing said transducer supporting means to be moved through said separating means;
a fourth opening associated with the separating means for allowing gas to be discharged from said rotating-disk housing to said drive-mechanism housing;
a second opening associated with the separating means for allowing said gas which flows into said drive-mechanism housing to be discharged through discharge means provided with filter means into said rotating-disk housing; and
flow resisting means for hindering the flow of said gas from said third opening to said second opening in said rotating-disk housing.

26. A rotating disk storage device according to claim 25, wherein said third opening has a plurality of windows for allowing one of the groups of said transducer supporting means to be moved through said separating means.

* * * * *